United States Patent
Bensinger et al.

(10) Patent No.: US 7,676,712 B2
(45) Date of Patent: Mar. 9, 2010

(54) SYSTEM AND METHOD OF CLOCKING AN IP CORE DURING A DEBUGGING OPERATION

(75) Inventors: Greg Bensinger, Apex, NC (US); Jean-Marc Brault, Fontenay le Fleury (FR); Hans Erich Multhaup, Munich (DE)

(73) Assignee: Mentor Graphics Corporation, Wilsonville, OR (US)

( * ) Notice: Subject to any disclaimer, the term of this patent is extended or adjusted under 35 U.S.C. 154(b) by 1101 days.

(21) Appl. No.: 10/501,461

(22) PCT Filed: Jan. 18, 2002

(86) PCT No.: PCT/EP02/00503

§ 371 (c)(1),
(2), (4) Date: Oct. 25, 2005

(87) PCT Pub. No.: WO03/060719

PCT Pub. Date: Jul. 24, 2003

(65) Prior Publication Data
US 2006/0059388 A1    Mar. 16, 2006

(51) Int. Cl.
*G01R 31/28* (2006.01)
*G06F 11/00* (2006.01)

(52) U.S. Cl. ............... 714/724; 714/742; 714/744; 714/29; 714/34; 714/35

(58) Field of Classification Search ............ 714/29, 714/34, 35, 724, 742, 744
See application file for complete search history.

(56) References Cited

U.S. PATENT DOCUMENTS 6,473,727 B1 * 10/2002 Kirsch et al. ............... 703/28

FOREIGN PATENT DOCUMENTS

| EP | 0 685 793 | 12/1995 |
| JP | 11-259329 | 9/1999 |
| WO | 01/20784 | 3/2001 |

OTHER PUBLICATIONS

Gernot Koch et al; Co-Emulation and Debugging of HW/SW-Systems, 1997 IEEE; pp. 120-125.
SungJoo Yoo et al; Fast Hardware-Software Coverification by Optimistic Execution of Real Processor; 2000 IEEE; pp. 663-668.
ISR off corresponding application PCT/EP02/00503 mailed Feb. 27, 2003.

* cited by examiner

*Primary Examiner*—John J Tabone, Jr.
(74) *Attorney, Agent, or Firm*—Banner & Witcoff, Ltd

(57) ABSTRACT

According to the invention, an IP core is clocked during a debugging operation by switching from the clock used for testing the device under test to a clock oscillator or any other free-running clock source.

7 Claims, 1 Drawing Sheet

SYSTEM AND METHOD OF CLOCKING AN IP CORE DURING A DEBUGGING OPERATION

This application is a National Stage application of PCT application PCT/EP02/00503 filed Jan. 18, 2002, which was published in English under PCT Article 21(2) on Jul. 24, 2003, Publication Number WO 03/060719.

BACKGROUND OF THE INVENTION

The present invention relates to a system and a method of clocking an IP core during a debugging operation.

In the design of integrated circuits, there is an increasing demand for emulation and verification tools. Hardware-based verification solutions have been around for years in two different embodiments: accelerators and emulators. Useful tools in emulation systems are so-called IP-Xpress kits which are emulation-ready kits for concurrent hardware and software verification of processor-based systems. Such IP-Xpress kits use microprocessor or DSP chips, mounted onto a printed-circuit-board to provide the functionality of the device to be connected to a design mapped into the emulator, and the kits consist of a board and HDL-wrapper files.

All processor-type IP cores require some external clock source. Hence, one or more clock signals are provided to the IP-Xpress boards. The clocks are provided either directly from the internal clock generators of the emulator or they may be driven from the design loaded onto the emulator.

Another way of providing clock to an IP core is by using a clock oscillator mounted onto the IP-Xpress board. In this case any frequency can be applied, i.e. there are no maximum clock frequency constraints due to the emulation system.

A key advantage of an IP-Xpress kit is to provide a fast running system verification environment in which application software is running on the IP core and this stimulating the design mapped to the emulator. In case of faulty system behaviour, the cause for this could either be in the application software or in the design (provided the IP core is functioning correctly). In order to identify the erroneous component of the system both the application software as well as the design has to be debugged. This can be done most conveniently when the hardware and software are stopped synchronously. On the one hand, this gives a good correlation between the design's status and the actual software execution, and on the other hand it enables to interrogate all resources of the design mapped onto the emulator system. This may mean, however, that the emulator clocks are stopped. In case the IP core is clocked by a clock generated by the emulator system, this would mean that the IP core is not clocked anymore. Hence, the software debugger would not necessarily work and as a result the resources of the software execution were not visible and a full system debugging would not be possible.

SUMMARY

It is the object of the present invention to provide a system and a method of clocking an IP core during a debugging operation. This object is achieved with the features of the claims.

In order to achieve this object, according to the present invention, the clock generation for the IP core when entering the system debugging mode is implemented on the IP-Xpress board itself. There is provided a clock oscillator and a switching means, and the switching means switches to the clock oscillator provided on the IP-Xpress board as soon as the system debug mode is entered. In order to initiate the switching operation, the switching means monitors signals specific to the IP core which indicate a breakpoint, e.g., EMU0/1 in case of TI C6x DSPs, and if these indicate that a breakpoint has been entered, the clock output of the switching means is driven from the clock oscillator. Hence, the IP core is continuously clocked even when the clocks of the emulator system are stopped. Furthermore, the software debugger is still functional in its system debug mode and all IP core internal resources and the software execution status can be investigated.

Upon leaving the system debug mode, the switching means is signalled to switch back to the clocks of the emulator system, and the system execution can continue in its normal operational mode.

DETAILED DESCRIPTION OF EXAMPLE EMBODIMENTS

Figure 1:
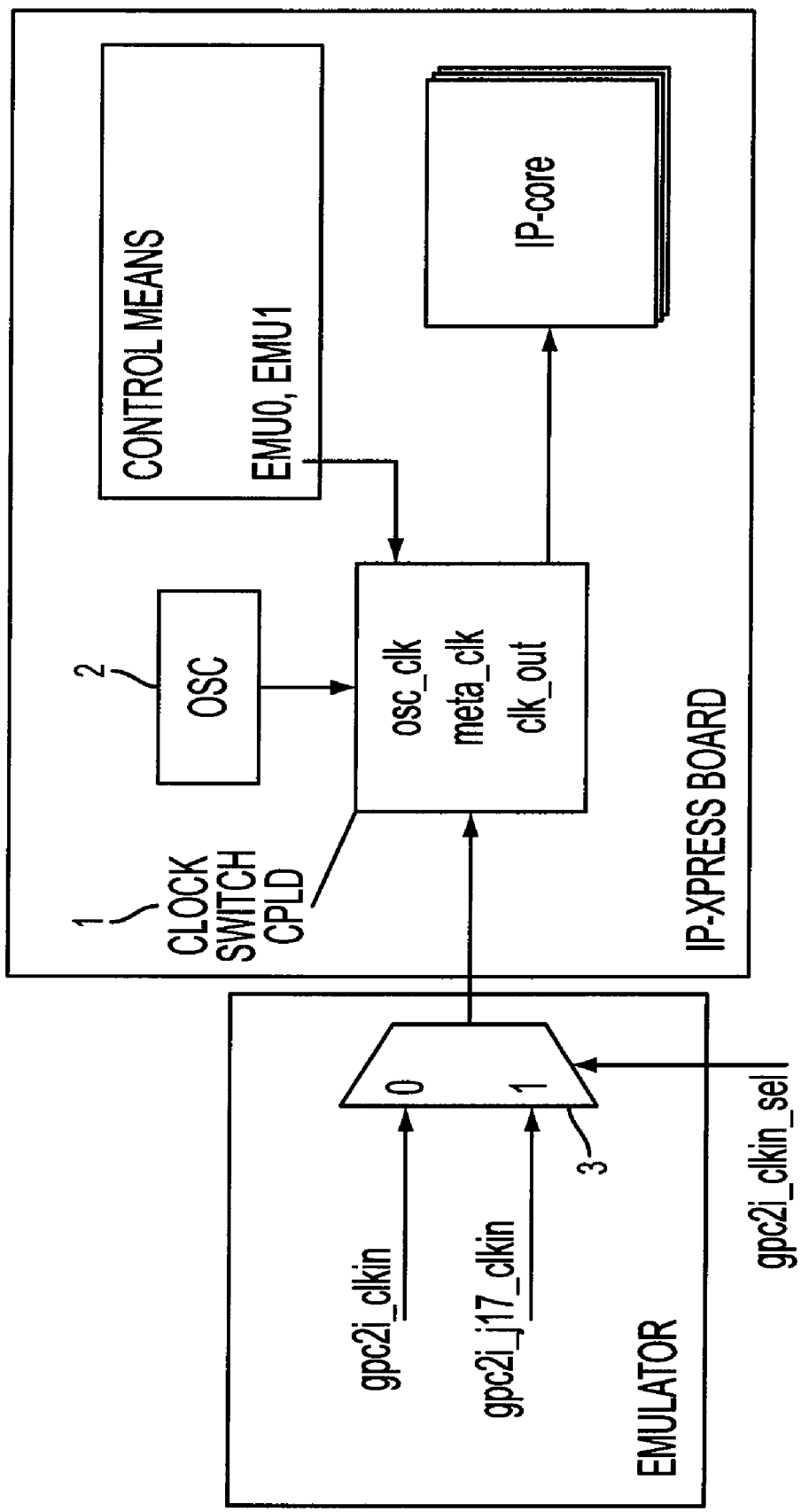
FIG. 1 is a schematic block diagram of a system in accordance with aspects of the invention.

The present invention will now be described with reference to FIG. 1. FIG. 1 shows a preferred embodiment of the present invention comprising a switching means 1. Connected to the switching means is a clock oscillator 2. On the left of the figure there are shown two possible clock sources for the normal operation of the emulator system. These clock signals are driven through the backplane of the emulator system onto the IP-Xpress board. The signal gpc2i_clkin is a driven clock from the design, and gpc2i_j17_clkin is a clock directly from the generator of the emulator. Depending on the select signal supplied to the multiplexer 3 either of these clocks is provided to the IP core. For example, the IP core is a DSP. The clock oscillator 2, the switching means 1 and the signals indicating a breakpoint form the clock generator when entering the breakpoint mode. The output of the switching means is a clock signal that clocks the IP core.

During normal operation of the emulator system, the switching means feeds a "regular" clock through its output. When the system debug mode is entered, the switching means switches from this "regular" clock to the clock oscillator provided on the IP-Xpress board.

The following code fractions demonstrate how the switching to the clock oscillator can be implemented inside the switching means.

```
-- ------------------------------------------------
-- Memorize breakpoint ( ie: !EMU0 or !EMU1)
-- ------------------------------------------------
process(RESET, EMU_LATCH_RST, OSC_CLK)
begin
    if (RESET = '0' or EMU_LATCH_RST = '0' ) then
        emu_trigger <= '0';
    elsif rising_edge(OSC_CLK) then
        if (EMU0 = '0' or EMU1 = '0' or emu_trigger = '1') then
            emu_trigger <= '1';
        else
            emu_trigger <= '0';
        end if;
    end if;
end process;
-- ------------------------------------------------
-- Latch emu_trigger with the falling edge of CLKIN1
-- ------------------------------------------------
process (RESET,CLKIN1)
begin
```

```
            if (RESET = '0') then
                clk_sel1 <= '0';
            elsif falling_edge(CLKIN1) then
                clk_sel1 <= emu_trigger;
            end if;
        end process;
        --------------------------------------------------
        -- Select the right clock for int_clk_for_dsp1.
        -- When the emulator is running select CLKIN1
        -- else, when a breakpoint occurs, select OSC_CLK
        -- so that the connection with the software debugger
        -- is not lost
        --------------------------------------------------
        process (CLKIN1, OSC_CLK, clk_sel1)
        begin
            case clk_sel1 is
                when '0' =>
                    int_clk_for_dsp1 <= CLKIN1;
                when '1' =>
                    int_clk_for_dsp1 <= OSC_CLK;
                when others =>
                    int_clk_for_dsp1 <= '0';
            end case;
        end process;
```

The invention claimed is:

1. A method of clocking an IP core and an emulated design, in conjunction with carrying out a debugging operation, comprising:
   clocking a design mapped onto an emulator to test the design;
   clocking the IP core with the same clock used for testing the design mapped onto the emulator; and
   upon a start of the debugging operation switching the clocking of the IP core from the clock used for testing the design mapped onto the emulator to a second clock source comprising a clock oscillator or any free-running clock source, for carrying out the debugging operation.

2. The method of claim 1, wherein said switching is to said clock oscillator, which is provided on an IP-Xpress board.

3. The method of claim 1, wherein the clock used for testing the design is either:
   a) a clock sourced from the design mapped into the emulator;
   b) a clock sourced directly from a clock generator circuit of the emulator; or
   c) a clock oscillator locally mounted on an IP-Xpress daughter board, or any free running clock source.

4. The method of claim 1, comprising the step of monitoring signals specific to the IP core which indicate a breakpoint in order to detect the breakpoint.

5. The method of claim 4, wherein said switching is performed upon detecting that the breakpoint has been entered.

6. The method of claim 1, wherein the IP core is a microprocessor or a DSP.

7. A system for clocking an IP core and an emulated design, in conjunction with carrying out a debugging operation, comprising:
   a first clock for clocking a design mapped onto an emulator to test the design, and to concurrently clock the IP core;
   switching means;
   a second clock source comprising a clock oscillator or any free-running clock source; and
   control means for sending a control signal to the switching means when a debugging operation is started, said control signal causing the switching means to switch clocking of said IP core from said first clock to said second clock source for carrying out the debugging operation.

* * * * *